United States Patent
Branfoot

(10) Patent No.: US 12,378,359 B2
(45) Date of Patent: Aug. 5, 2025

(54) LIQUID PROCESSIBLE DIPHTHALONITRILE MONOMERS AND RESINS

(71) Applicant: ROLLS-ROYCE plc, London (GB)

(72) Inventor: Callum Branfoot, Derby (GB)

(73) Assignee: ROLLS-ROYCE PLC, London (GB)

( * ) Notice: Subject to any disclaimer, the term of this patent is extended or adjusted under 35 U.S.C. 154(b) by 471 days.

(21) Appl. No.: 18/067,441

(22) Filed: Dec. 16, 2022

(65) Prior Publication Data
US 2023/0212353 A1 Jul. 6, 2023

(30) Foreign Application Priority Data
Dec. 23, 2021 (GB) ................................. 2118874

(51) Int. Cl.
*C08G 69/38* (2006.01)
*C07F 7/18* (2006.01)
*C09D 177/00* (2006.01)

(52) U.S. Cl.
CPC ............ *C08G 69/38* (2013.01); *C07F 7/1804* (2013.01); *C09D 177/00* (2013.01)

(58) Field of Classification Search
None
See application file for complete search history.

(56) References Cited

FOREIGN PATENT DOCUMENTS

| CN | 109608489 A | * | 4/2019 | ............... C07F 7/188 |
| EP | 3211023 A1 | | 8/2017 | |
| WO | WO-2016064298 A1 | * | 4/2016 | ............ C07F 7/1804 |

OTHER PUBLICATIONS

WO2016064298 English machine translation, prepared Jun. 2, 2025. (Year: 2025).*
CN109608489 English machine translation, prepared Jun. 2, 2025. (Year: 2025).*
Rudyak, V.Y., et al., "Complex Curing Pathways and Their Influencec on the Phthalonitrile Resin Hardening and Elasticity," Macromolecular Theory and Simulations, 2017, vol. 26, 1700015, 5 pp.
Jun. 15, 2023 extended Search Report issued in European Patent Application No. 22209249.6.
Bulgakov et al, "Low-melting phthalonitrile thermosetting monomers with siloxane and phosphate bridges", European Polymer Journal 84 (2016) pp. 205-217.
Babkin et al, "Low-melting siloxane-bridges phthalonitriles for heat-resistant matrices", European Polymer Journal 66 (2015) pp. 452-457.

* cited by examiner

Primary Examiner — Christopher M Rodd
(74) Attorney, Agent, or Firm — Oliff PLC

(57) ABSTRACT

Diphthalonitrile compounds of formula I:

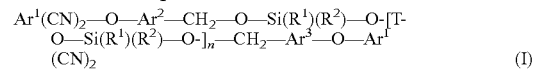

in free or salt or solvate form, wherein: $Ar^1$ is a $C_6$-$C_{10}$-aryl group; $Ar^2$ is a $C_6$-$C_{10}$-aryl group; $R^1$ and $R^2$ are independently $C_5$-$C_{10}$-alkyl; T is a $C_6$-$C_{10}$-aryl group; and n is 0, 1, 2, 3, 4 or 5, or a mixture thereof; Cured diphthalonitrile thermosets are provided by curing resin blends of such compounds.

11 Claims, 3 Drawing Sheets

LIQUID PROCESSIBLE DIPHTHALONITRILE MONOMERS AND RESINS

CROSS-REFERENCE TO RELATED APPLICATIONS

This specification is based upon and claims the benefit of priority from United Kingdom patent application number GB 2118874.3 filed on Dec. 23, 2021, the entire contents of which is incorporated herein by reference.

BACKGROUND

Field of the Disclosure

The present disclosure concerns diphthalonitrile compounds, diphthalonitrile resin blends, and diphthalonitrile resins, and their use in preparing protective coatings.

Description of the Related Art

Phthalonitrile (aka benezene-1,2-dicarbonitrile) is an organic compound with the formula $C_6H_4(CN)_2$ that is observed as an off-white crystal that is solid at room temperature. It has low solubility in water but it is soluble in common organic solvents. Phthalonitrile is typically used to prepare phthalocyanine, which is used as a dye or pigment.

Phthalonitrile compounds, i.e. compounds that include a phthalonitrile moiety, can be used in the manufacture of composites, coatings, adhesives, and other speciality chemical materials. However many phthalonitrile derivatives, especially those containing silicon tend to have poor moisture stability.

It is known to prepare resins from certain phthalonitrile compounds however such resins tend to be poorly liquid processible, i.e. they are essentially incapable of being combined with fibres using liquid composite moulding techniques including resin infusion and resin transfer moulding. Such processes typically require a viscosity of <150 cP at the injection temperature, which is generally below 200° C. and ideally below 140° C. Most historic phthalonitrile compounds do not fulfil these criteria. The feature of phthalonitriles that makes them most valuable compared to conventional thermoset resins is the thermal stability after polymerisation and in particular, their uniquely high thermal decomposition temperatures, which are usually in excess of 400 or even 450° C. This stability is a direct product of the strong phthalocyanine and triazine units, which form the crosslinks in the cured material.

In addition to the thermal stability, the processing characteristics and stability of the uncured resin are also of fundamental importance. The polar, highly aromatic structure of phthalonitriles means that they usually have high melting points (>150° C.) and as such do not achieve a processible viscosity until they are raised above 200 or even 250° C. This is particularly problematic because, when catalysed, most phthalonitriles begin curing at ~250° C. Crucially, high viscosity resins are not appropriate for liquid composite moulding techniques because fibre impregnation is greatly hindered. Poor impregnation results in a range of defects in the product fibre-reinforced composite, including dry fibres and voids. Accordingly, phthalonitriles should ideally be designed to be low-melting and low viscosity at common liquid resin injection temperatures (80 to 140° C.). Furthermore, these uncured phthalonitriles should be stable prior to their cure. Although there is nothing intrinsically unstable about phthalonitriles themselves, strategies to decrease melting point and viscosity, can introduce groups that make the overall molecular structure unstable (e.g. to heat or moisture).

Bulgakov et al, *European Polymer Journal* 84 (2016) pages 205-217 studied certain low-melting siloxane- and phosphate-bridged phthalonitrile monomers. These include two diphthalonitrile compounds, namely bis(3-(3,4-dicyanophenoxy)phenyl)-phenyl phosphate (4a) and bis(3-(3,4-dicyanophenoxy)phenyl)phenylphosphonate (4b), which have a central phosphate group and a glass transition temperature of 21 and 42° C. respectively. It is understood that these glass transition temperatures can also be described as melting point temperatures.

Babkin et al, *European Polymer Journal* 66 (2015) pages 452-457 have disclosed certain low-melting siloxane-bridged phthalonitrile monomers. These include two diphthalonitrile compounds, namely 4,4'-(((((diphenylsilanediyl)bis(oxy))bis-(methylene))bis(4,1-phenylene))bis(oxy)) diphthalonitrile (3) and 4,4'-(((((phenyl(methyl)-silanediyl)bis(oxy))bis(methylene))bis(4,1-phenylene))bis(oxy)) diphthalonitrile (4), which have a central siloxane group and a glass transition temperature of 27 and 12° C. respectively. Once again it is understood that these glass transition temperatures can also be described as melting point temperatures.

European patent application EP 3211023 A1 (Babkin et al) discloses phthalonitrile monomers modified with organosilicon fragments and a method of obtaining them. The modified phthalonitriles can be used in aircraft and automobile manufacturing to produce polymer composite materials.

Zhang et al, *Journal of Applied Polymer Science* (2014) 40919 pages 1 to 7 have disclosed silicon-containing phthalonitrile monomers and self-catalyzed silicon-containing phthalonitrile resins. The monomers include three diphthalonitrile monomers, namely HSiPN (4,4'-((((methylsilanediyl)bis(azanediyl))bis(4,1-phenylene))bis(oxy))-diphthalonitrile), MeSiPN (4,4'-((((dimethylsilanediyl)bis(azanediyl))bis(4,1-phenylene))-bis(oxy))diphthalonitrile) and ViSiPN (4,4'-((((methyl(vinyl)silanediyl)bis(azanediyl))-bis(4,1-phenylene))bis(oxy))diphthalonitrile), which have a central diaminosilane group and a melting point of 43, 59 and 40° C. respectively. Such compounds have however proved in use to be unstable, i.e. to the moisture in ambient air, and there of very limited utility.

It is therefore desirable to provide diphthalonitrile compounds, diphthalonitrile resin blends and diphthalonitrile resins with improved processability or to at least provide useful alternatives to known diphthalonitrile compounds, diphthalonitrile resin blends and diphthalonitrile resins.

SUMMARY OF THE DISCLOSURE

In a first aspect the present disclosure provides a diphthalonitrile compound of formula I:

$$Ar^1(CN)_2\text{—}O\text{—}Ar^2\text{—}CH_2\text{—}O\text{—}Si(R^1)(R^2)\text{—}O\text{—}[T\text{—}O\text{—}Si(R^3)(R^4)\text{—}O\text{—}]_n\text{—}CH_2\text{—}Ar^2\text{—}O\text{—}Ar^1(CN)_2 \quad (I)$$

in free or salt or solvate form, wherein:
$Ar^1$ is a $C_6$-$C_{10}$-aryl group;
$Ar^2$ is a $C_6$-$C_{10}$-aryl group;
$R^1$ and $R^2$ are independently $C_3$-$C_{10}$-alkyl;
T is a $C_6$-$C_{10}$-aryl group; and
n is 0, 1, 2, 3, 4 or 5, or a mixture thereof.

In certain embodiments the diphthalonitrile compound is a compound of formula I, wherein:

Ar¹ is a $C_6$-$C_8$-aryl group;
Ar² is a $C_6$-$C_8$-aryl group;
R¹ and R² are independently $C_3$-$C_6$-alkyl;
T is a $C_6$-$C_8$-aryl group; and
n is 0, 1, 2, or 3, or a mixture thereof.

In certain embodiments the diphthalonitrile compound is a compound of formula I, wherein:
Ar¹ is a phenyl group;
Ar² is a phenyl group;
R¹ and R² are independently propyl or butyl;
T is a phenyl group; and
n is 0, 1, 2, or 3, or a mixture thereof.

In a second aspect the present disclosure provides a diphthalonitrile resin blend comprising one or more diphthalonitrile compounds of the first aspect, and an aromatic amine catalyst.

In a third aspect the present disclosure provides a diphthalonitrile resin comprising a cured diphthalonitrile resin blend of the second aspect.

In a fourth aspect the present disclosure provides a coating comprising a diphthalonitrile resin of the third aspect.

In a fifth aspect the present disclosure provides a process for preparing a diphthalonitrile compound of the first aspect.

In a sixth aspect the present disclosure provides a process for preparing a diphthalonitrile resin of the third aspect, the method comprising curing a diphthalonitrile resin blend of the second aspect to form a diphthalonitrile resin of the third aspect.

The term "phthalonitrile" as used herein means an organic compound with the formula $C_6H_4(CN)_2$ that is observed as an off-white crystal that is solid at room temperature. The IUPAC name for phthalonitrile is benezene-1,2-dicarbonitrile.

The term "phthalonitrile compound" as used herein means any organic compound that includes a $C_6H_4(CN)_2$ moiety.

The term "diphthalonitrile" as used herein means any organic compound that includes two $C_6H_4(CN)_2$ moieties.

The term "eutectic mixture" as used herein means a homogeneous mixture of a first phthalonitrile compound and a second phthalonitrile compound that melts or solidifies at a single temperature that is lower than the melting point of the first phthalonitrile compound or the second phthalonitrile compound.

The term "aromatic amine catalyst" as used herein means a catalyst that includes at least one aromatic group that substituted by at least one amino group. In some embodiments the aromatic amine catalyst is 4,4'-((sulfonylbis(4,1-phenylene))-bis(oxy))dianiline (p-BAPS), 3,3'-(1,3-phenylenebis(oxy))dianiline (m-APB), or 4-(4-aminophenoxy)phthalonitrile.

The term "$C_1$-$C_{10}$-alkyl group" as used herein means as used herein denotes straight chain or branched alkyl having 1 to 10 carbon atoms. In some embodiments $C_1$-$C_{10}$-alkyl is methyl, ethyl, n-propyl, isopropyl, n-butyl, s-butyl, i-butyl, t-butyl, —$C(CH_3)_2C_2H_5$, —$CH(CH_3)C_3H_7$ or —$CH(CH_3)CH_2C(CH_3)_3$.

The term "$C_1$-$C_{10}$-alkylene group" as used herein means a straight chain or branched alkylene that contains one to ten carbon atoms, for example, methylene, ethylene, trimethylene, methylethylene, tetramethylene, —$CH(CH_3)CH_2CH_2$—, —$CH_2CH(CH_3)CH_2$—, straight or branched pentylene, straight or branched hexylene, straight or branched heptylene, straight or branched octylene, straight or branched nonylene, or straight or branched decylene. $C_1$-$C_{10}$-alkylene may be $C_1$-$C_4$ alkylene, e.g. ethylene or methylethylene.

The term "$C_6$-$C_{10}$-aryl group" as used herein means a monovalent carbocyclic aromatic group that contains 6 to 10 carbon atoms and which may be, for example, a monocyclic group such as phenyl or a bicyclic group such as naphthyl. $C_6$-$C_{10}$-aryl may be $C_6$-$C_8$-aryl, e.g. phenyl.

The term "halo" as used herein means an element belonging to group 17 (formerly group VII) of the Periodic Table of Elements, which may be, for example, fluorine, chlorine, bromine or iodine. In some embodiments, halo is chloro.

The term "$C_6$-$C_{10}$-aryl group" as used herein means a monovalent carbocyclic aromatic group that contains 6 to 10 carbon atoms and which may be, for example, a monocyclic group such as phenyl or a bicyclic group such as naphthyl. $C_6$-$C_{10}$-aryl may be $C_6$-$C_8$-aryl, e.g. phenyl.

The term "leaving group" as used herein means a molecular fragment that departs with a pair of electrons in heterolytic bond cleavage. Good leaving groups are typically weak bases. In some embodiments, the leaving group is halo, e.g. chloro, or the leaving group is a triflate group (OTf).

The term "solvate" as used herein denotes a molecular complex comprising a compound of the present invention and one or more solvent molecules, for example ethanol. The term "hydrate" is used when the solvent is water.

The term "processible" as used herein means, e.g. with respect to a resin, being capable of being combined with fibres using liquid composite moulding techniques including resin infusion and resin transfer moulding. Such processes typically require a viscosity of <150 cP at the injection temperature, which is generally below 200° C. and ideally below 140° C.

Other than in the operating examples, or where otherwise indicated, all numbers expressing quantities of ingredients used herein are to be understood as modified in all instances by the term "about".

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
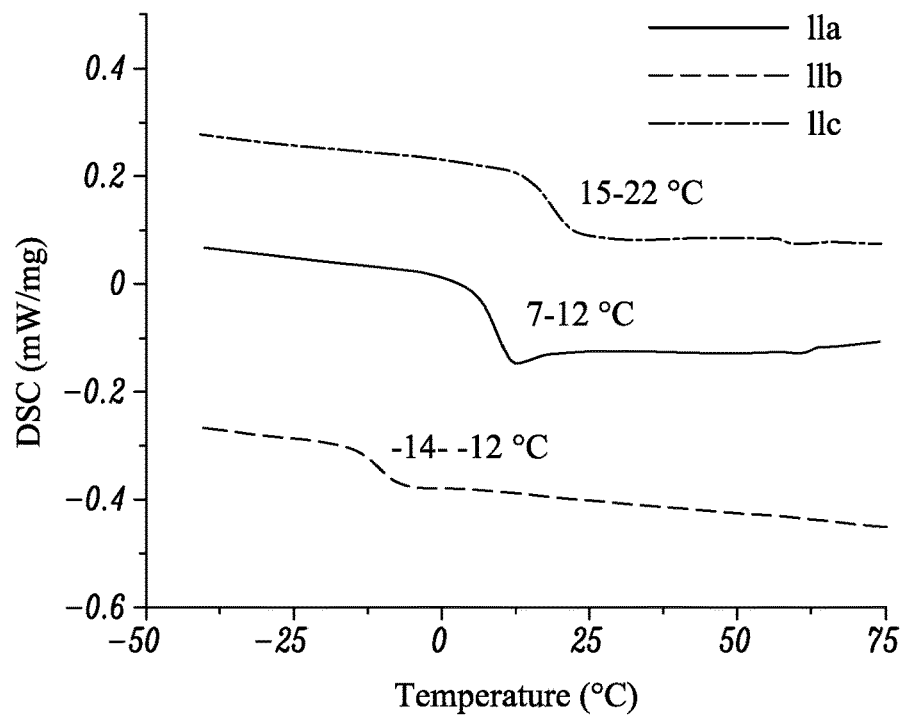
FIG. 1 is a graph that shows the melt/glass transitions of diphthalonitrile compounds of formulae IIa, IIb and IIc by differential scanning calorimetry (DSC).

Aspects and embodiments of the present disclosure will now be discussed with reference to the accompanying drawings. Further aspects and embodiments will be apparent to those skilled in the art.

The present disclosure concerns diphthalonitrile compounds or monomers, diphthalonitrile resin blends that include one or more of such diphthalonitrile compounds, diphthalonitrile resins that comprise such diphthalonitrile resin blends that have been cured, coatings that comprise such diphthalonitrile resins. The present disclosure also concerns a process for preparing such diphthalonitrile compounds and a process for preparing such diphthalonitrile resins.

These aspects of the present disclosure will be described separately.

Diphthalonitrile Compounds or Monomers

In a first aspect there is provided a diphthalonitrile compound of formula I:

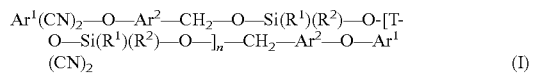

(I)

in free or salt or solvate form, wherein:
$Ar^1$ is a $C_6$-$C_{10}$-aryl group;
$Ar^2$ is a $C_6$-$C_{10}$-aryl group;
$R^1$ and $R^2$ are independently $C_3$-$C_{10}$-alkyl;
T is a $C_6$-$C_{10}$-aryl group; and
n is 0, 1, 2, 3, 4 or 5, or a mixture thereof.

While not wanting to be bound by theory, the poor moisture stability of known silicon-containing phthalonitriles (PNs) is overcome via incorporation of bulky, hydrophobic groups onto the Si centre, conferring stability both by sterically shielding the Si—O bonds from attacking water molecules and by strengthening the Si—O bonds by electronic induction. The bulky silicon units have the additional advantage of suppressing the melting point, conferring resins made therefrom with desirable processing characteristics.

Again while not wanting to be bound by theory, Si-groups can confer greater melting point suppression (improved processability) than phosphate groups, e.g. as per the compounds of the aforementioned Bulgakov et al, *European Polymer Journal* 84 (2016) pages 205-217. The phosphate structure also offers less 'tuneability' or capacity for modification than the Si-groups of the compounds of the present disclosure. The siloxane structures of the aforementioned Babkin et al, *European Polymer Journal* 66 (2015) pages 452-457 are not air stable, i.e. they react with the moisture in the air and decompose over a relatively short period of time. And the aminosilane structures of the aforementioned Zhang et al, *Journal of Applied Polymer Science* (2014) 40919 pages 1 to 7 are not air stable and decompose rapidly when in contact with atmospheric moisture.

In some embodiments, $Ar^1$ is a $C_6$-$C_8$-aryl group, e.g. phenyl.

In some embodiments, $Ar^2$ is a $C_6$-$C_8$-aryl group, e.g. phenyl.

In some embodiments, $R^1$ is $C_3$-$C_6$-alkyl, e.g. propyl or butyl, In some embodiments, propyl is isopropyl and/or butyl is t-butyl.

In some embodiments, $R^2$ is $C_3$-$C_6$-alkyl, e.g. propyl or butyl, In some embodiments, propyl is isopropyl and/or butyl is t-butyl.

In some embodiments, $R^1$ and $R^2$ are the same. In some embodiments, $R^1$ and $R^2$ are the different.

In some embodiments, T is a $C_6$-$C_8$-aryl group, e.g. phenyl.

In some embodiments, n is 0, 1, 2, or 3, or a mixture thereof.

In some embodiments the diphthalonitrile compound is a compound of formula I in free or salt or solvate form, wherein:
$Ar^1$ is a $C_6$-$C_8$-aryl group;
$Ar^2$ is a $C_6$-$C_8$-aryl group;
$R^1$ and $R^2$ are independently $C_3$-$C_6$-alkyl;
T is a $C_6$-$C_8$-aryl group; and
n is 0, 1, 2, or 3, or a mixture thereof.

In some embodiments the diphthalonitrile compound is a compound of formula I in free or salt or solvate form, wherein:
$Ar^1$ is a phenyl group;
$Ar^2$ is a phenyl group;
$R^1$ and $R^2$ are independently propyl or butyl;
T is a phenyl group; and
n is 0, 1, 2, or 3, or a mixture thereof.

The diphthalonitrile compound of formula I may be a compound of formula IIa:
a.

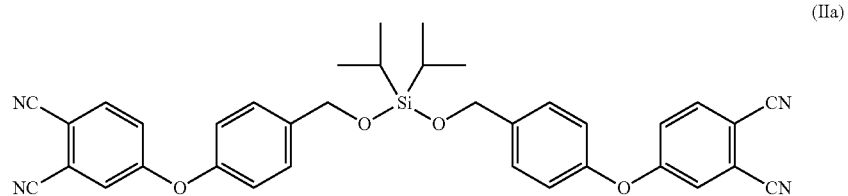 [SMILES: CC(C)[Si](OCc1ccc(Oc2ccc(C#N)c(C#N)c2)cc1)(OCc1ccc(Oc2ccc(C#N)c(C#N)c2)cc1)C(C)C]

(IIa)

in free or salt or solvate form.

This compound is a viscous liquid or oily solid at room temperature (dependent on purity) and is moisture stable. It is thus compatible with conventional composites processing techniques e.g. infusion, resin transfer moulding (RTM), prepreg/ATL/ATP (automated tape laying/automated fibre placement).

The diphthalonitrile compound of formula I may be a compound of formula IIb:
a.

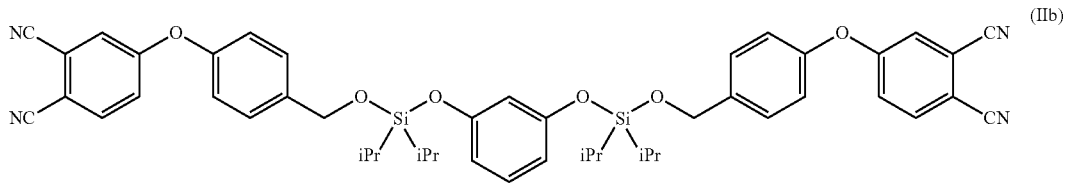 [SMILES: CC(C)[Si](OCc1ccc(Oc2ccc(C#N)c(C#N)c2)cc1)(Oc1cccc(O[Si](OCc2ccc(Oc3ccc(C#N)c(C#N)c3)cc2)(C(C)C)C(C)C)c1)C(C)C]

in free or salt or solvate form, where n is 0, 1, 2 or 3, or a mixture thereof.

In some embodiments the diphthalonitrile compound of formula I is a mixture of compounds of formula IIb with n=1 as the modal species.

Oligomerisation enables one to modify or tune the material properties of resins made from the diphthalonitrile compounds, for example by varying the constituent ratio and/or substitution of different diols (e.g. resorcinol, bisphenol $C_2$).

The diphthalonitrile compound of formula I may be a compound of formula IIc:
a.

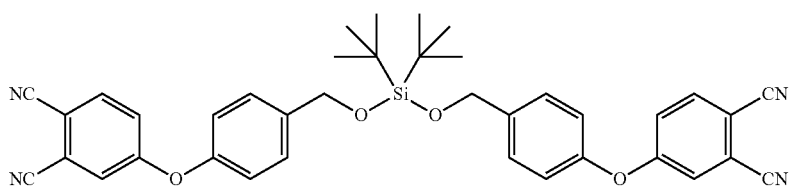

in free or salt or solvate form.

Compounds of formula I, which includes compounds of formulae IIa, IIb and IIc, can be prepared using known procedures or using the process described below.

Compounds of formula I are useful as monomers from which diphthalonitrile resins can be prepared. Such resins have various applications including as coatings for aerospace components, e.g. gas turbine aircraft components.

Diphthalonitrile Resin Blends

In a second aspect there is provided diphthalonitrile resin blends that include one or more of diphthalonitrile compounds of the first aspect. The diphthalonitrile resin blends are formulated as to be curable diphthalonitrile resin blends. They may be so formulated in many ways that are known in the art.

In some embodiments the curable diphthalonitrile resin blend is free of any solvent, or at least substantially free of any solvent. This is desirable for several reasons. It reduces safety risks for those who manufacture and otherwise work with the materials. It is environmentally advantageous as it means using fewer chemicals, being less reliant on petroleum-based feedstocks, and minimising chemical waste. From a processing perspective, it avoids the need to remove any solvent from the final product thereby simplifying processing, maximising yield, and minimising the formation of voids in the product that could weaken the product. Furthermore, solvent systems generally cannot be processed by liquid composite moulding.

The curable diphthalonitrile resin blend can be formulated to fine-tune one or more properties of the resin produced by curing it. Such properties may include, for example, the process ability/fluidity/viscosity prior to curing, thermo-mechanical properties (e.g. glass-transition temperature), thermal and thermo-oxidative stability, reactivity, extremely low dielectric constant, and flame retardancy moisture absorption, and/or erosion performance.

The curable diphthalonitrile resin blend typically has a low viscosity that makes blending much easier than would be expected of high viscosity materials.

In some embodiments the curable diphthalonitrile resin blend includes a catalyst in order to lower the cure initiation temperature. This is useful when low temperature processing is needed. Curable diphthalonitrile resin blends of the present disclosure typically include a catalyst as curing/polymerisation typically occurs at 250° C. or higher.

The catalyst, when desired or necessary, catalyses the polymerisation of the monomers.

The catalyst can take many forms suitable for the required purpose. In some embodiments the catalyst is an aromatic amine catalyst.

Various aromatic amine catalysts are known in the art.

In some embodiments the aromatic amine catalyst is 4,4'-((sulfonylbis(4,1-phenylene))-bis(oxy))dianiline (aka p-BAPS), 3,3'-(1,3-phenylenebis(oxy))dianiline (aka m-APB), or 4-(4-aminophenoxy)phthalonitrile.

In some embodiments the diphthalonitrile resin blend comprises a eutectic mixture of two or more compounds of formula I in free or salt or solvate form.

In some embodiments the diphthalonitrile resin blend comprises two or more of the group consisting of a compound of formula IIa, a compound of formula IIb, and a compound of formula IIc.

If desired, any further additives including alternative DPNs and/or toughening agents can be added to the blend, e.g. in proportions between 1 and 40 mol %, such that the proportion of IIa remains between 50 and 90 mol %.

Diphthalonitrile Resins

In a third aspect there is provided diphthalonitrile resins that comprise diphthalonitrile resin blends of the second aspect that have been cured, i.e. cured diphthalonitrile thermosets.

The curing process can be performed by any art known curing method. Such methods may include autoclaving, hot pressing, or liquid moulding.

The resin comprises thermoset polymers with low viscosities (e.g. about <1000 mPa·s) at temperatures lower than about 100° C., making liquid composite moulding feasible at temperatures below about 50° C., and in some cases at ambient temperature. The low viscosity and fluidity of the blend facilitates suitably wetting and suitably covering the fibres when impregnating the fibrous reinforcement in the manufacture of laminates/composites.

The liquid processible diphthalonitrile resins of the present disclosure have desirable electrical, thermal, and other properties that enable useful applications in various industries including the aerospace and electronics industries.

In the aerospace industry for example, liquid processible diphthalonitrile resins of the present disclosure can be combined with a fibrous reinforcement, such as carbon or glass, to produce composite materials, which possess properties that provide weight, strength and other advantages over more traditionally used metals such as steel and aluminium.

Desirable properties of cured diphthalonitrile thermosets of the present disclosure as represented by those formed from diphthalonitrile compounds of formulae IIa, IIb and IIc are demonstrated in the Examples, more particularly Example 10.

The significant improvement in air stability exhibited by IIa, IIb and IIc indicates that a variety of structures related to these compounds would be expected to have both good processing characteristics (low melting point and viscosity) and high moisture stability. Accordingly, the structure of IIb could be tuned in one of at least three ways to affect the physical properties of both the liquid resin and the cured thermoset network:

(1) Vary the stoichiometry of the diol, i.e. the number n. Where n=0, the structure IIb=IIa. This species would be expected to exhibit the maximum melting temperature and maximum crosslink density (in the cured thermoset). In contrast, with increasing values of n, the melting point would be expected to decrease and the crosslink density (of the cured thermoset) would also be expected to decrease, which could result in less stiff, but more tough thermosets.
(2) Vary the diol. The original structure of IIb uses resorcinol as the diol, but by substitution of alternative aromatic diols, different properties might be conferred, without significantly compromising the demonstrated performance. For example, by using bisphenol C2 instead of resorcinol, the resulting thermoset would be expected to exhibit improved fire retardance properties due to the integration of chlorine atoms.
(3) Vary the silane. In the three diphthalonitrile compounds of formula IIa, IIb and IIc described herein, two different silanes were used. As long as at least one of the silane's organic fragments is bulky (i.e. isopropyl, tert-butyl, sec-butyl, etc.) then the resultant diphthalonitrile compound would be expected to have both a low viscosity and reasonable, if not good, moisture tolerance. In the Examples, also it is demonstrated that the synthesis of these species is functional with either chloride or triflate (trifluoromethanesulfonate) leaving groups. It is therefore likely that these syntheses would tolerate silyl bromides, iodides and silanes bonded to other good leaving groups.

Coatings

In a fourth aspect there is provided a coating that comprises a diphthalonitrile resin of the third aspect.

Such coatings have various applications including providing protective coatings for aerospace components, e.g. gas turbine aircraft components.

Such coatings enable aerospace components to maintain their required functionality when exposed to high temperatures, e.g. up to 400° C.

The coating can be applied to the aerospace component using any suitable method known in the art. The thickness of the coating can be determined by the skilled person for the desired function.

Process for Preparing Diphthalonitrile Compounds

In a fifth aspect there is provided a process for preparing diphthalonitrile compounds of the first aspect, i.e. diphthalonitrile compounds of formula I:

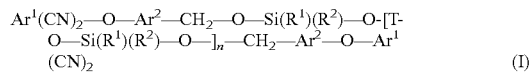

where $Ar^1$, $Ar^2$, $Ar^3$, $Ar^4$, L, $R^1$, $R^2$, $R^3$, $R^4$, and n are as hereinbefore defined.

The process for preparing a diphthalonitrile compound of formula I, in free or salt or solvate form, comprises:
(i) (A) for the preparation of a compound where n is 0, reacting a compound of formula III:

where $Ar^1$ and $Ar^2$ are as hereinbefore defined, with a compound of formula IV:

a. where $R^1$ and $R^2$ are as hereinbefore defined and L is a leaving group; or (B) for the preparation of a compound where n is 1, 2, 3, 4 or 5 or
a mixture thereof, reacting a compound of formula III:

where $Ar^1$ and $Ar^2$ are as hereinbefore defined, with a compound of formula (V):

b. where T is as hereinbefore defined, and a compound of formula IV:

c. where $R^1$ and $R^2$ are as hereinbefore defined and L is leaving group; and (ii) recovering the resultant compound of formula I in free or salt or solvate form.

Process variant (A) may be effected using known procedures of reacting alcohols with silanes or analogously, for example as hereafter described in the Examples. The reaction may be conveniently carried out in a solvent, e.g. tetrahydrofuran, and in the presence of a base, e.g. triethylamine.

Process variant (B) may be effected using known procedures of reacting alcohols with silanes or analogously, for example as hereafter described in the Examples. The reaction may be conveniently carried out in a solvent, e.g. tetrahydrofuran, and in the presence of a base, e.g. triethylamine.

Leaving groups are well known in the art and the skilled person can select suitable leaving groups. Good leaving groups are typically weak bases. In some embodiments, the leaving group is halo, e.g. chloro, or the leaving group is a triflate group (OTf).

Compounds of formula III are commercially available or may be prepared as demonstrated in the Examples.

Compounds of formula IV and V are commercially available or may be prepared by known procedures.

Process for Preparing Diphthalonitrile Resins.

In a sixth aspect there is provided a process for preparing diphthalonitrile resins of the third aspect. The diphthalonitrile resins are prepared by curing diphthalonitrile resin blends of the second aspect.

As mentioned above, the curing process can be performed by any art known curing method. Such methods may include autoclaving, hot pressing or liquid moulding.

In some embodiments the diphthalonitrile resin blend is partially cured to prevent or minimise phase separation during the curing step.

The diphthalonitrile resin blend may be degassed after the partial curing, e.g. under vacuum at 90° C. for 30 minutes or until there are no visual bubbles in the mixture, to remove entrapped air before the curing step to prevent or at least minimise the formation voids in the cured product.

For example, the curing is performed at an elevated temperature, e.g. at 250° C. for about 3 hours, at 315° C. for about 3 hours and at 375° C. for about 8 hours.

An additional post curing step may be performed to increase the thermal stability of the resin.

It will be understood that the invention is not limited to the embodiments above-described and various modifications and improvements can be made without departing from the concepts described herein.

EXAMPLES

The follow examples are provided to illustrate embodiments of the resin composition and resin blend of the present disclosure.

Preparation of Intermediates

Intermediate X: 4-(4-formylphenoxy)phthalonitrile

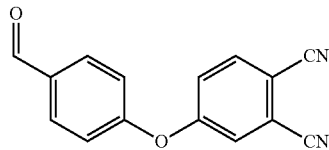 [SMILES: N#Cc1ccc(Oc2ccc(C=O)cc2)cc1C#N]

4-hydroxybenzaldehyde (4.00 g, 32.8 mmol) and K$_2$CO$_3$ (4.53 g, 32.8 mmol) were added against a flow of N$_2$ to a flame-dried Schlenk flask equipped with magnetic stirrer. N,N-dimethylformamide (DMF, 15 ml) was then added and the reaction vessel cooled to 0° C. In a separate flame-dried Schlenk flask, 4-nitrophthalonitrile (5.67 g, 32.7 mmol) was added and then dissolved in DMF (15 ml). The resulting 4-nitrophthalonitrile solution was then added to the first Schlenk incrementally over the course of 15-20 minutes, producing an orange suspension that became dark brown with further addition. The reaction mixture was then heated to 70° C. and stirred for a further 2.5 hours. Thereafter, the reaction mixture was poured into ice water (~400 ml), and the resultant brown precipitate isolated via Büchner filtration (4×50 ml aqueous washes). The brown filtrand was then dissolved in CH$_2$Cl$_2$ and washed with brine (3×40 ml). The CH$_2$Cl$_2$ solution was then dried through addition of MgSO$_4$ and filtered prior to rotary evaporation, resulting in intermediate X as an off-white solid (6.75 g, 83%). $^1$H NMR (DMSO-D6, 400 MHZ): 10.01 (s, 1H, (CO)H); 8.18 (d, 1H, J$_{HH}$=8.70 Hz, (CN)ArH); 8.02 (d, 2H, J$_{HH}$=8.82, 2.59 Hz, (para)ArH); 7.98 (m, 1H, (CN)ArH); 7.59 (dd, 1H, J$_{HH}$=8.71, 2.58 Hz, (CN)ArH); 7.36 (d, 2H, J$_{HH}$=8.52 Hz, (para)ArH). In agreement with literature data.

Intermediate Y: 4-(4-(hydroxymethyl)phenoxy)phthalonitrile

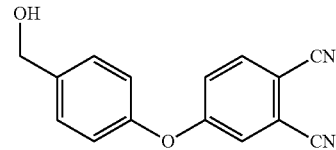 [SMILES: N#Cc1ccc(Oc2ccc(CO)cc2)cc1C#N]

Intermediate X (4.48 g, 18.0 mmol) was added against a flow of N$_2$ to a flame-dried Schlenk flask equipped with magnetic stirrer. Tetrahydrofuran (THF, 20 ml) was added to the flask, the resultant suspension was then cooled to 0° C. prior to the addition of sodium borohydride (1.03 g, 27.2 mmol). Methanol (10 ml) was then slowly (10 minutes) added to the reaction mixture, resulting in the formation of an orange solution. The reaction was stirred for 1 hour and then quenched by pouring into ice water (200 ml). The resultant aqueous suspension was then acidified to pH 3-4 via the careful addition of aqueous HCl. The crude product (a brown oil) was then extracted into diethyl ether (3×50 ml). The combined organic fractions were washed with brine (2×50 ml) and then treated with MgSO$_4$. After filtration, the product was concentrated under vacuum, revealing an orange-brown oil, which was dried overnight and eventually formed intermediate Y as an off-white solid (4.35 g, 96%). $^1$H NMR (DMSO-D6, 400 MHZ): 8.09 (d, 1H, J$_{HH}$=8.82, (CN)ArH); 7.75 (d, 1H, J$_{HH}$=2.57 Hz, (CN)ArH); 7.43 (m, 2H, (para)ArH); 7.34 (dd, 1H, J$_{HH}$=8.75, 2.60 Hz, (CN)ArH); 7.16 (m, 2H, (para)ArH); 5.26 (t, 1H, OH), 4.53 (d, 2H, J$_{HH}$=5.67, CH$_2$). In agreement with literature data.

Example 1 Preparation of a Diphthalonitrile Compound of Formula IIa

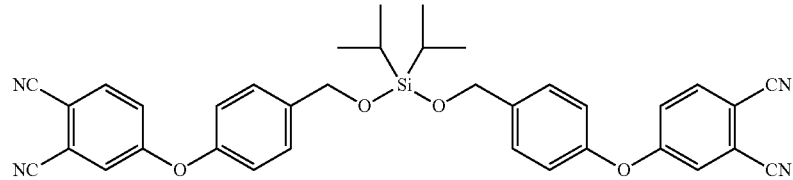

(IIa)

Intermediate Y (1.00 g, 4.00 mmol) was added against a flow of $N_2$ to a flame-dried Schlenk flask equipped with magnetic stirrer. THF (10 ml) and triethylamine (1.67 ml, 12.0 mmol) were added to the flask and the resultant solution was then cooled to 0° C. Dichlorodiisopropylsilane (370 mg, 0.361 ml, 2.0 mmol) was then added (dropwise over 5 min) to the reaction mixture. The reaction was allowed to gradually warm to room temperature and stirred for 24 hours. At this stage, TLC (thin layer chromatography, 50:50 (ethyl acetate:hexane) was used to monitor the reaction via comparison with intermediate Y. The crude reaction mixture (an orange solution) was then filtered by cannula to another Schlenk and concentrated under vacuum, affording IIa as a red oil (1.10 g, 90%). $^1$H NMR (CDCl$_3$, 400 MHZ): 7.74 (m, 2H, (CN)ArH); 7.46 (m, 4H, (para)ArH); 7.27 (m, 4H, (CN)ArH); 7.07 (m, 4H, (para)ArH); 4.93 (s, 4H, CH$_2$); 1.15 (m, 14H, alkyl-H).

The compound of formula IIa is 4,4'-((((diisopropylsilanediyl)bis(oxy))bis(methylene))-bis(4,1-phenylene))bis-(oxy))diphthalonitrile.

Example 2 Preparation of a Diphthalonitrile Compound of Formula IIb

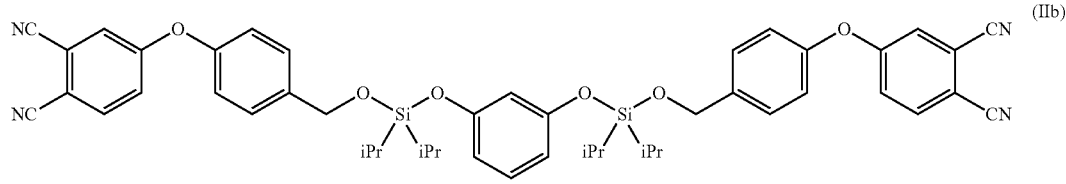 [SMILES: CC(C)[Si](OCc1ccc(Oc2ccc(C#N)c(C#N)c2)cc1)(Oc1cccc(O[Si](OCc2ccc(Oc3ccc(C#N)c(C#N)c3)cc2)(C(C)C)C(C)C)c1)C(C)C]

Intermediate Y (1.57 g, 6.27 mmol) and resorcinol (345 mg, 3.14 mmol) were added to a flame-dried Schlenk flask equipped with a magnetic stirrer. THF (20 ml) and triethylamine (5 ml) were added and the solids dissolved. The solution was then cooled to 0° C. prior to the dropwise addition of dichlorodiisopropyl-silane (1.16 g, 6.27 mmol, 1.13 ml) over 10 minutes. The reaction was warmed to 35° C. and left to stir for 20 hours. Thin layer chromatography (50:50 ethyl acetate:hexane) revealed a small quantity of residual intermediate Y. A further 10 ml of THF was added to the reaction, which was then left to stir for a further 24 hours. The reaction was then filtered and the residue washed with THF (3×30 ml). The solvent was then removed under reduced pressure and the product dried overnight under vacuum at 90° C., revealing IIb as a dark red oil (2.648 g, 99%). $^1$H NMR (CDCl$_3$, 400 MHZ): 7.71 (m, 2H, ArH), 7.44 (m, 4H, ArH), 7.24 (m, 4H, ArH), 7.04 (m, 5H, ArH), 6.59 (m, 3H, ArH), 4.92 (m, 4H, CH$_2$), 1.08 (m, 30H, $^i$PrH). FTIR v(CN)/cm$^{-1}$: 2232.

The compound of formula IIb where n is 1 is 4,4'-((((((1,3-phenylenebis(oxy))bis-(diisopropylsilanediyl))bis(oxy))bis(methylene))bis(4,1-phenylene))bis(oxy))-diphthalonitrile. However the procedure described above provides a mixture of compounds of formula IIb where n is 0, 1, 2 or 3, or more particularly a mixture of compounds of formula IIb with n=1 as the modal species.

Example 3 Preparation of a Diphthalonitrile Compound of Formula IIc

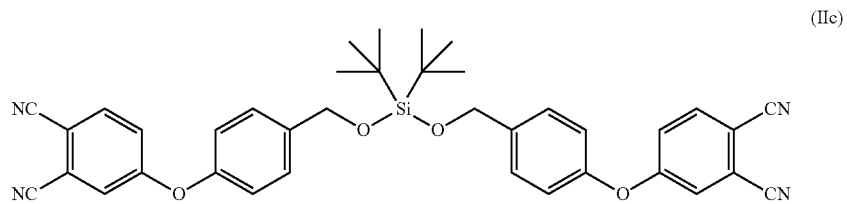 [SMILES: CC(C)(C)[Si](OCc1ccc(Oc2ccc(C#N)c(C#N)c2)cc1)(OCc1ccc(Oc2ccc(C#N)c(C#N)c2)cc1)C(C)(C)C]

Intermediate Y (2.5 g, 9.99 mmol) was added to a flame-dried Schlenk flask equipped with magnetic stirrer and dissolved in THF (25 ml). Triethylamine (4.2 ml, 15 mmol) was then added, and the combined solution cooled to 0° C. $^t$Bu$_2$Si(OTf)$_2$ (1.63 ml, 5.00 mmol) was added dropwise over 5 minutes. The reaction mixture was then allowed to warm to room temperature and left to stir for 24 hours. Volatiles were removed under reduced pressure and then the crude product was dissolved in CH$_2$Cl$_2$ (50 ml). This solution was then washed with a combination of deionised water (3×50 ml) and brine (20 ml), which facilitated the separation of organic and aqueous layers. The organic fraction was separated, dried over MgSO$_4$, filtered and then concentrated under reduced pressure, affording IIc as a golden-brown oil (2.008 g, 63%). $^1$H NMR (DMSO-d6, 400 MHz): 7.72 (m, 2H, Ar(CN)H), 7.45 (m, 4H, Ar(para)H), 7.26 (m, 4H, Ar(CN)H), 7.06 (m, 4H, Ar(para)H), 5.01 (s, 4H, CH$_2$), 1.14 (s, 18H, CH$_3$). FTIR v (CN)/cm$^{-1}$: 2232. The compound of formula IIc is 4,4'-(((((di-tert-butylsilanediyl)bis(oxy))bis(methylene))-bis(4,1-phenylene))bis(oxy))diphthalonitrile.

Example 4 Preparation of a Diphthalonitrile Resin Blend

A diphthalonitrile compound of formula IIa was heated to approximately 100° C. in an aluminium pan. Thereafter, 4-(4-aminophenoxy)phthalonitrile was added (10 mol %) and manually stirred into the liquid resin until a homogeneous red-brown mixture was formed.

Example 5 Preparation of a Diphthalonitrile Resin Blend

A diphthalonitrile compound of formula IIb was heated to approximately 100° C. in an aluminium pan. Thereafter, 4-(4-aminophenoxy)phthalonitrile was added (10 mol %) and manually stirred into the liquid resin until a homogeneous red-brown mixture was formed.

Example 6 Preparation of a Diphthalonitrile Resin Blend

A diphthalonitrile compound of formula IIc was heated to approximately 100° C. in an aluminium pan. Thereafter, 4-(4-aminophenoxy)phthalonitrile was added (10 mol %) and manually stirred into the liquid resin until a homogeneous red-brown mixture was formed.

Example 7 Preparation of a Cured Diphthalonitrile Thermoset 80 ml of the diphthalonitrile resin blend formed in Example 4 was poured into a mould, in which it was degassed for 20 minutes at 100° C. in a vacuum oven. Resin samples were cured in a muffle furnace (under an $N_2$ atmosphere) using the following cure cycle; 250° C. for 3 hours, 315° C. for 3 hours, and 375° C. for 8 hours, each yielding a thermally stable diphthalonitrile thermoset of the present disclosure.

Example 8 Preparation of a Cured Diphthalonitrile Thermoset 80 ml of the diphthalonitrile resin blend formed in Example 5 was poured into a mould, in which it was degassed for 20 minutes at 100° C. in a vacuum oven. Resin samples were cured in a muffle furnace (under an $N_2$ atmosphere) using the following cure cycle; 250° C. for 3 hours, 315° C. for 3 hours, and 375° C. for 8 hours, each yielding a thermally stable diphthalonitrile thermoset of the present disclosure.

Example 9 Preparation of a Cured Diphthalonitrile Thermoset 80 ml of the diphthalonitrile resin blend formed in Example 6 was poured into a mould, in which it was degassed for 40 minutes at 100° C. in a vacuum oven. Resin samples were cured in a muffle furnace (under an $N_2$ atmosphere) using the following cure cycle; 250° C. for 3 hours, 315° C. for 3 hours, and 375° C. for 8 hours, each yielding a thermally stable diphthalonitrile thermoset of the present disclosure.

Example 10 Liquid Processing Optimisation of Cured Diphthalonitrile Thermosets

FIG. 1 demonstrates that each of the diphthalonitrile compounds of formulae IIa, IIb and IIc have melting/softening points between −10° C. and 20° C., i.e. less than room temperature, 298 K). This is in sharp contrast to most conventional diphthalonitrile compounds, which have melting points in excess of 150° C.

Since the diphthalonitrile compounds are highly amorphous materials, they do not exhibit a sharp melting event, instead they exhibit second order transitions, i.e. step changes in the heat capacity. These transitions are labelled as ranges on FIG. 1.

Figure 2:
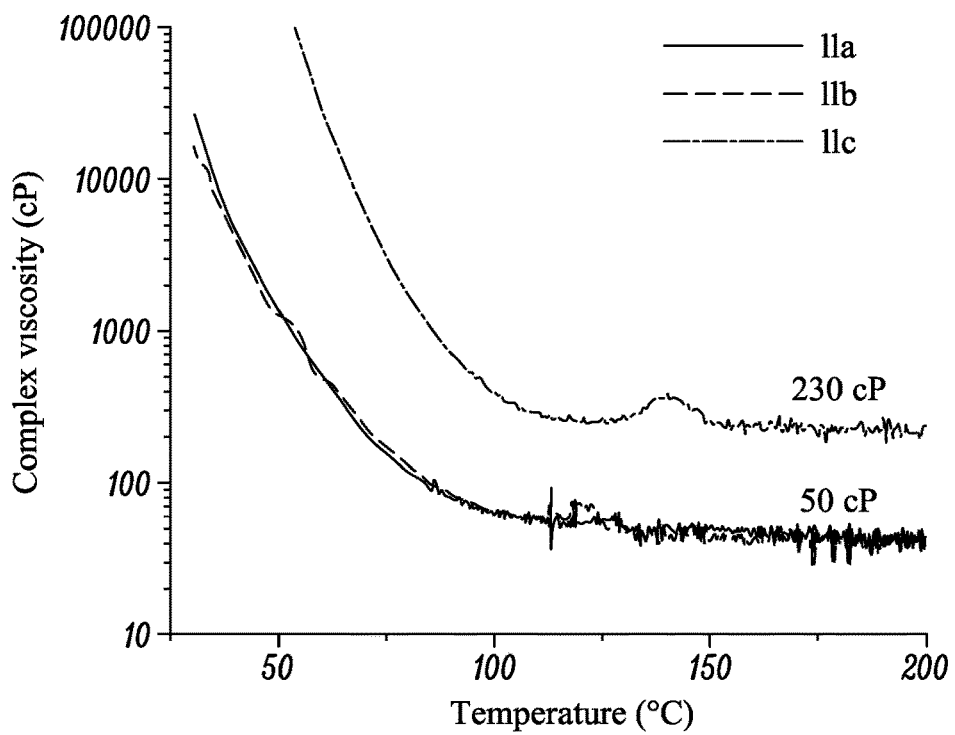
FIG. 2 is a graph that shows rheology curves of diphthalonitrile compounds of formulae IIa, IIb and IIc (parallel plate, 0.5 mm gap, 1 Hz, 1.5% oscillatory strain).

FIG. 2 shows the dynamic viscosities of the diphthalonitrile compounds of formulae IIa, IIb and IIc (parallel plate, 0.5 mm gap, 1.5% oscillatory strain, 2° C./min). From these curves it can be seen that IIa and IIb reached an optimal viscosity (~150 cP) for infusion type composite moulding processes such as resin transfer moulding (RTM) at approximately 75° C. The viscosity then dropped to a minimum of 50 cP, which gives an additional margin of viscosity that could be used to accommodate increased viscosity due to additives in the resin formulation. Although the minimum viscosity of IIc is 230 cP, which makes it less appropriate for infusion type processes, this higher viscosity is well suited for alternative composites processing techniques such as prepregging. This marginally higher viscosity minimum also indicates suitably for coatings applications.

The viscosity curves shown in FIG. 2 confirm that IIa/IIb are compatible liquid infusion techniques. The slightly higher viscosity of IIc is more suitable for prepregging.

Figure 3:
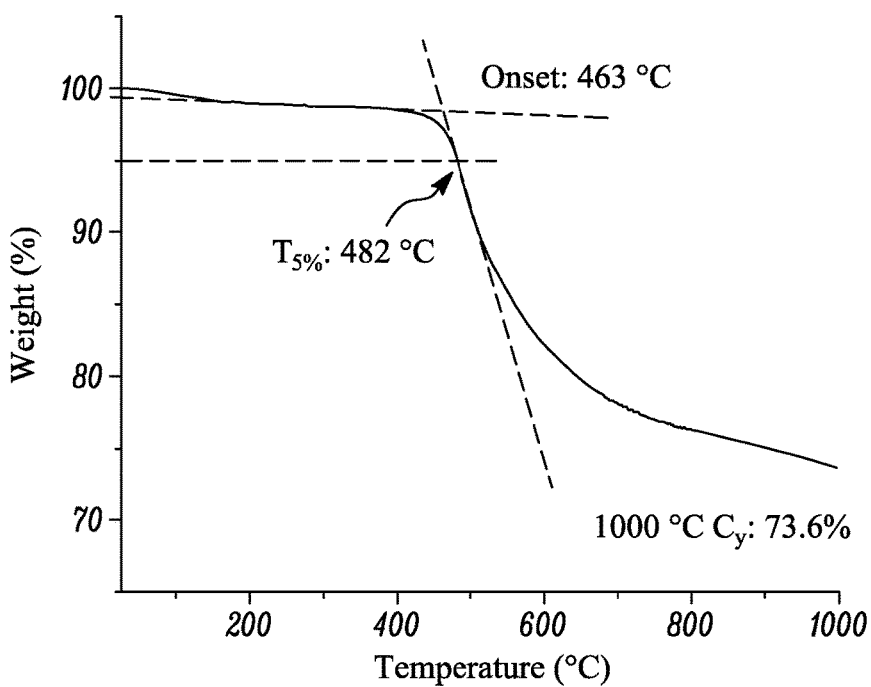
FIG. 3 is a graph that shows thermogravimetric analysis (TGA) data concerning one embodiment of this work (IIa, 5° C./min, $N_2$ atmosphere).

FIG. 3 shows that a cured blend of IIa exhibits the high thermal stability typical of diphthalonitrile thermosets. The onset of degradation>450° C. and 1000° C. char yield (>70%) are in the expected region for phthalonitriles under a nitrogen atmosphere.

Figure 4:
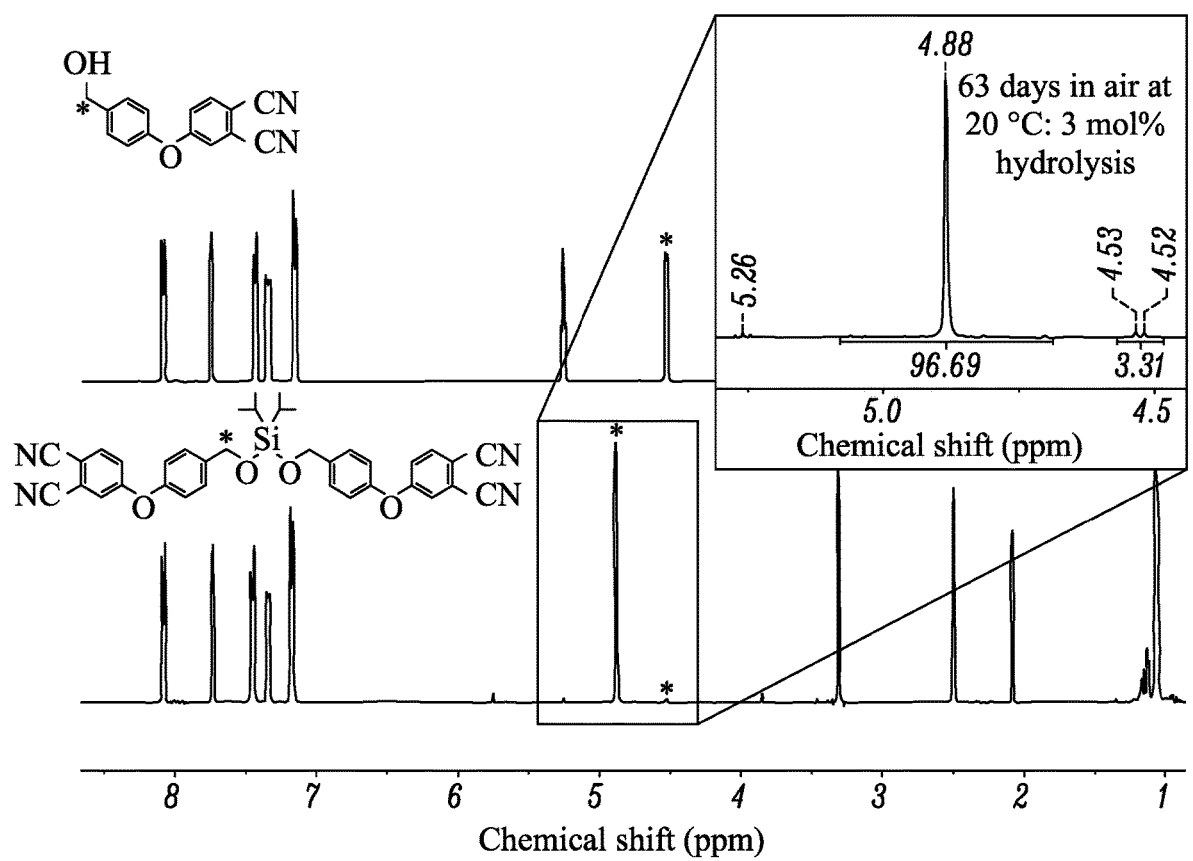
FIG. 4 is a ¹H NMR spectrum of one embodiment of this work (IIa) after exposure to air for 9 weeks, compared with an authentic spectrum of the hydrolysis product (grey) evidencing excellent resistance to hydrolysis.

The good moisture stability of an uncured diphthalonitrile resin blend is demonstrated by the $^1$H NMR spectra in FIG. 4. Only 3 mol % of the 'IIa' sample (FIG. 4, bottom) has hydrolysed to the related alcohol (an authentic sample is shown in FIG. 4, top) after 63 days of exposure to air (at ca. 20° C.).

Figure 5:
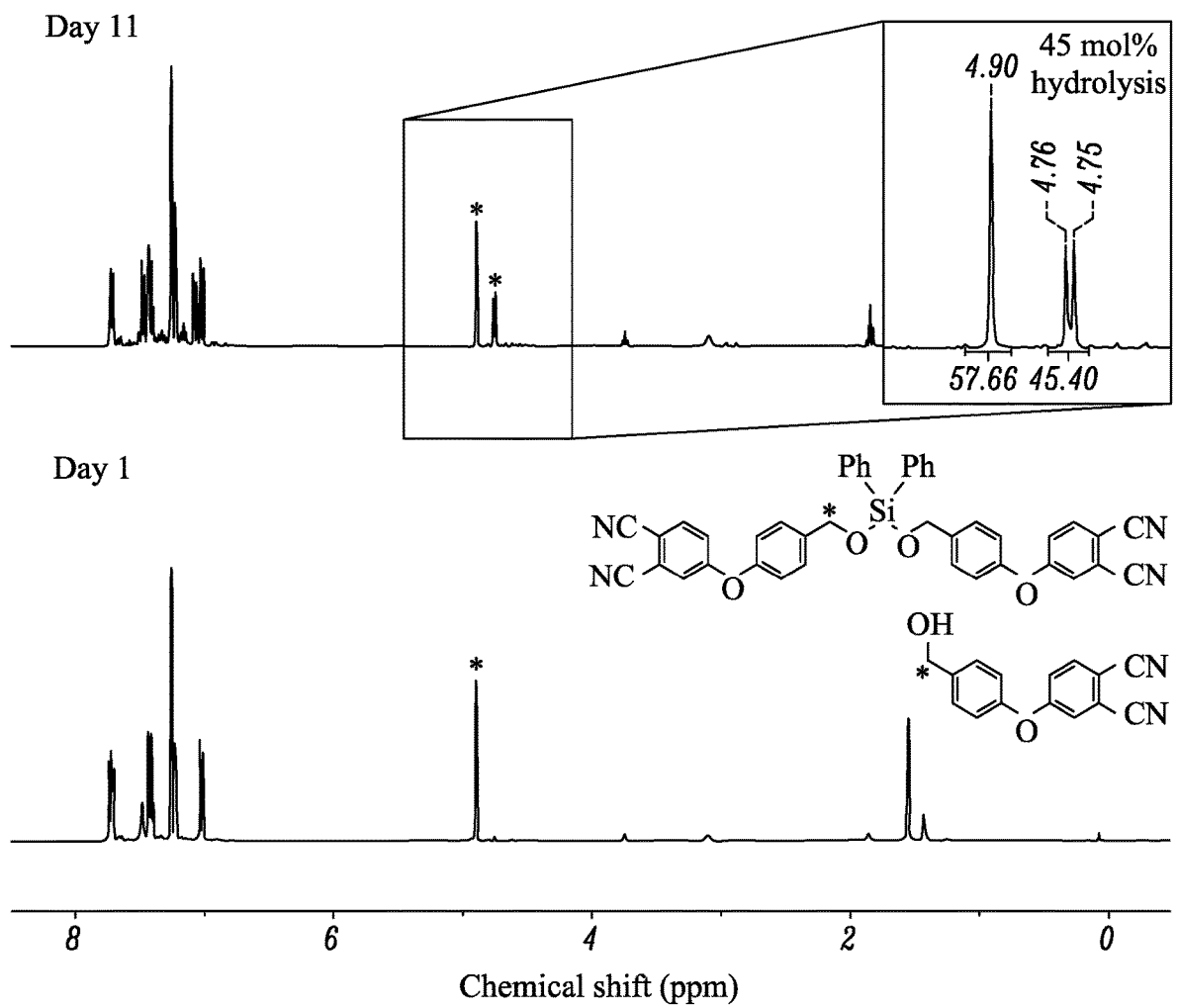
FIG. 5 is a $^1$H NMR spectrum of a previously reported diphthalonitrile before (black) and after (grey) exhibiting poor resistance to hydrolysis.

In contrast, the much poorer hydrolytic stability of a literature diphthalonitrile is shown in FIG. 5. In this figure, two spectra are shown, which compare the diphthalonitrile before and after exposure to air for 11 days (at ca. 20° C.). In this time, almost half of the sample has hydrolysed to the alcohol.

FIGS. 4 and 5 therefore evidence the greatly enhanced air-moisture stability of IIa compared with an example of prior art. IIa has also been observed to remain tolerant of air-moisture up to 250° C., which means that it remains stable during processing and curing conditions. This is not feasible with the prior art. In these cases the diphthalonitrile compounds would decompose due to reaction with atmospheric moisture prior to their curing, unless all processing steps (and storage) were performed under an inert atmosphere, which is at best most impractical.

I claim:

1. A diphthalonitrile compound of formula I:

$$Ar^1(CN)_2—O—Ar^2—CH_2—O—Si(R^1)(R^2)—O-[T-O—Si(R^1)(R^2)—O-]_n—CH_2—Ar^2—O—Ar^1(CN)_2 \quad (I)$$

in free or salt or solvate form, wherein:
$Ar^1$ is a $C_6$-$C_{10}$-aryl group;
$Ar^2$ is a $C_6$-$C_{10}$-aryl group;
$R^1$ and $R^2$ are independently $C_3$-$C_{10}$-alkyl;
T is a $C_6$-$C_{10}$-aryl group; and
n is 0, 1, 2, 3, 4 or 5, or a mixture thereof.

2. The diphthalonitrile compound of claim 1, wherein:
$Ar^1$ is a $C_6$-$C_8$-aryl group;
$Ar^2$ is a $C_6$-$C_8$-aryl group;
$R^1$ and $R^2$ are independently $C_3$-$C_6$-alkyl;
T is a $C_6$-$C_8$-aryl group; and
n is 0, 1, 2, 3, 4 or 5, or a mixture thereof.

3. The diphthalonitrile compound of claim 1, wherein:
$Ar^1$ is a phenyl group;
$Ar^2$ is a phenyl group;
$R^1$ and $R^2$ are independently propyl or butyl;
T is a phenyl group; and
n is 0, 1, 2, or 3, or a mixture thereof.

4. The diphthalonitrile compound of claim 1 that is a compound of formula IIa:

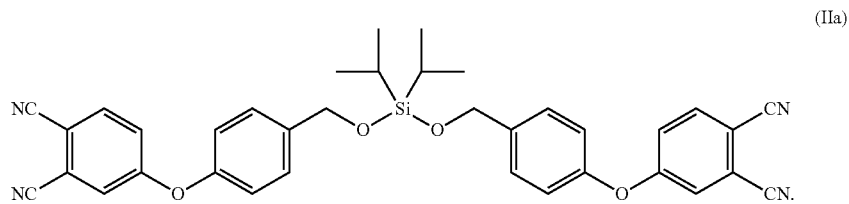 [SMILES: CC(C)[Si](OCc1ccc(Oc2ccc(C#N)c(C#N)c2)cc1)(OCc1ccc(Oc2ccc(C#N)c(C#N)c2)cc1)C(C)C]

5. The diphthalonitrile compound of claim 1 that is a compound of formula IIb:

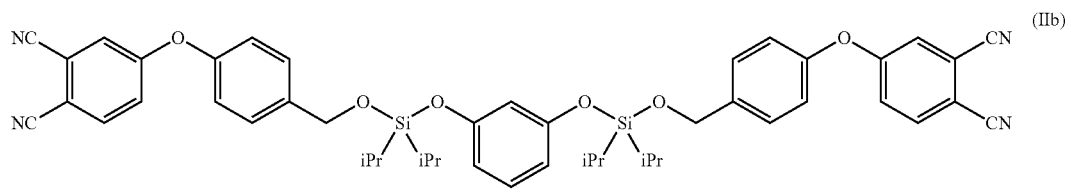

where n is 1, 2 or 3, or a mixture thereof.

6. The diphthalonitrile compound of claim 5, which is a mixture of compounds of formula IIb with n=1 as the modal species.

7. The diphthalonitrile compound of claim 1 that is a compound of formula IIc:

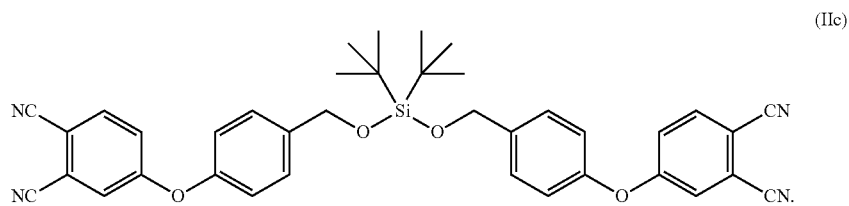 [SMILES: CC(C)(C)[Si](OCc1ccc(Oc2ccc(C#N)c(C#N)c2)cc1)(OCc1ccc(Oc2ccc(C#N)c(C#N)c2)cc1)C(C)(C)C]

8. The diphthalonitrile compound of claim 1, wherein the compound has a melting point of 60° C. or lower.

9. A diphthalonitrile resin blend comprising one or more diphthalonitrile compounds of claim 1, and an aromatic amine catalyst.

10. The diphthalonitrile resin blend of claim 9, wherein the aromatic amine catalyst is selected from 4,4'-((sulfonylbis(4,1-phenylene))-bis(oxy))dianiline (p-BAPS), 3,3'-(1,3-phenylenebis(oxy))dianiline (m-APB), and 4-(4-aminophenoxy)phthalonitrile.

11. A coating comprising a diphthalonitrile resin that comprises a cured diphthalonitrile resin blend of claim 9.

* * * * *